US012618735B2

(12) United States Patent
Maurus

(10) Patent No.: US 12,618,735 B2
(45) Date of Patent: May 5, 2026

(54) METHOD FOR MONITORING THE OPERATION OF A CAPACITIVE PRESSURE MEASURING CELL

(71) Applicant: IFM Electronic GmbH, Essen (DE)

(72) Inventor: Manfred Maurus, Bad Waldsee (DE)

(73) Assignee: IFM Electronic GmbH, Essen (DE)

( * ) Notice: Subject to any disclaimer, the term of this patent is extended or adjusted under 35 U.S.C. 154(b) by 381 days.

(21) Appl. No.: 18/230,636

(22) Filed: Aug. 5, 2023

(65) Prior Publication Data

US 2024/0060840 A1      Feb. 22, 2024

(30) Foreign Application Priority Data

Aug. 18, 2022    (DE) .......................... 102022120883.4

(51) Int. Cl.
*G01L 9/00*          (2006.01)
(52) U.S. Cl.
CPC ................................. *G01L 9/0072* (2013.01)
(58) Field of Classification Search
CPC .......... G01L 9/0072; G01L 9/12; G01L 1/144

USPC ........................................................ 73/724
See application file for complete search history.

(56) References Cited

U.S. PATENT DOCUMENTS

2021/0010892 A1* 1/2021 Walter ...................... G01L 9/12

* cited by examiner

*Primary Examiner* — Peter J Macchiarolo
*Assistant Examiner* — John M Royston
(74) *Attorney, Agent, or Firm* — Patent Technologies, LLC; Robert D. Gunderman, Jr.

(57) ABSTRACT

A method for monitoring the operation of a capacitive pressure measuring cell which has a measuring capacitor $(C_M)$ and a reference capacitor $(C_R)$ is disclosed, where an internal excitation voltage $U_{E0}$ is applied in the form of an alternating square-wave signal, and the pressure measured value p is obtained from the capacitance values of the measuring capacitor $(C_M)$ and the reference capacitor $(C_R)$. The excitation voltage $U_{E0}$ is converted into a voltage signal $U_{COM}$ by integration, with additional voltage values being acquired over time such that the value of the voltage signal $U_{COM}$ is indicative of an external influence of either an electromagnetic and/or low-frequency nature or a resistive interfering influence caused by moisture.

8 Claims, 5 Drawing Sheets

METHOD FOR MONITORING THE OPERATION OF A CAPACITIVE PRESSURE MEASURING CELL

CROSS REFERENCE TO RELATED PATENT APPLICATIONS

This application claims priority to German Patent Application 10 2022 120 883.4 filed on Aug. 18, 2022 entitled "Verfahren zur Funktionsüberwachung einer kapazitiven Druckmesszelle" (Method For Monitoring The Operation of a Capacitive Pressure Measuring Cell) by Manfred Maurus, the entire disclosure of which is incorporated herein by reference in its entirety.

BACKGROUND OF THE INVENTION

1. Field of the Invention

This invention relates generally to pressure sensors, and more specifically to a method for monitoring the operation of a pressure measuring cell of a capacitive pressure sensor.

2. Description of Related Art

Capacitive pressure sensors, or pressure measuring devices, are used in many areas of industry for pressure measurement. They frequently have a ceramic pressure measuring cell as a transducer for the process pressure, and evaluation electronics for signal processing.

Capacitive pressure measuring cells have a ceramic base body and a membrane, with a glass solder ring arranged between the base body and the membrane. The resultant cavity between the base body and the membrane facilitates longitudinal mobility of the membrane due to a pressure influence. This cavity is therefore also referred to as a measurement chamber. On the underside of the membrane and on the opposite top side of the base body, there is provision for respective electrodes, which together form a measuring capacitor. The action of pressure leads to a deformation of the membrane, resulting in a change of capacitance in the measuring capacitor.

An evaluation unit is used to record the change of capacitance and to convert it into a pressure measured value. These pressure sensors are generally used for monitoring or controlling processes. They are therefore frequently connected to superordinate control units (PLCs).

German Patent DE 198 51 506 C1 discloses a capacitive pressure sensor in which the pressure measured value is determined from the quotient of two capacitance values, relating to a measuring capacitor and a reference capacitor. Although this patent specification does not specifically describe a pressure measuring cell, the circuit shown and the method described are suitable for capacitive pressure measuring cells. The particular feature of this pressure measuring device is that only the amplitude of the square-wave signal, regardless of the frequency thereof, is relevant for evaluating the measurement signal at the output, as a measure of the recorded pressure measured value.

European Patent EP 0 569 573 B1 discloses a circuit arrangement for a capacitive pressure sensor that likewise involves the use of a quotient method for pressure evaluation. Quotient methods are generally based on the following pressure dependencies:

$$p \sim \frac{C_R}{C_M} \text{ and/or } p \sim \frac{C_R}{C_M} - 1 \text{ or } p \sim \frac{C_M - C_R}{C_M + C_R},$$

where $C_M$ denotes the capacitance of the measuring capacitor, $C_R$ denotes the capacitance of the reference capacitor and p denotes the process pressure to be determined. There is also conceivably the option of interchanging $C_M$ and $C_R$ in the quotient. However, the indicated example with $C_M$ in the denominator is the most common form in support of self-linearization. This embodiment is therefore assumed below, unless indicated otherwise.

Reliability in capacitive pressure sensors is becoming more and more important. A desirable aim is to optimize the measurement principle in pressure sensors with regard to potential leakage currents on the back of the measuring cell—the side facing away from the medium to be measured—or in parts of the evaluation electronics for the purposes of eliminating humidity portions that may have been introduced by the environment and have a tendency to condense.

German Patent DE 103 33 154 A1 and German Patent DE 10 2014 201 529 A1 disclose monitoring the operation of capacitive pressure sensors.

German Patent DE 197 08 330 C1 and European Patent EP 2 738 535 A1 provide further general background information.

German Patent DE 10 2018 118 645 B3 and German Patent DE 10 2018 118 646 B3 each disclose a method for monitoring the operation of a pressure measuring cell of a capacitive pressure sensor. German Patent DE 10 2018 118 645 B3 is based on the knowledge that there is a fixed relationship between pulse height, or amplitude, and period duration, or frequency, in the nominal pressure range of the pressure sensor and that the square-wave signal formed from the above-described quotients of the measuring capacitor $C_M$ and the reference capacitor $C_R$ changes significantly when medium enters the measuring chamber—as a result of damage to the measuring membrane or ingress via the ventilation channel. German Patent DE 10 2018 118 646 B3 discloses where moisture on the back of the measuring cell, facing away from the medium to be measured, or in parts of the evaluation electronics and the leakage currents resulting therefrom bring about a change in the measurement signal present in the form of an alternating square-wave signal. Instead of uniform square-wave pulses having an amplitude, or pulse height, which is constant over the course of the pulse width, the amplitude, or pulse height, is no longer constant in the case of the erroneous measurement signal but rises or falls over the course of the pulse width.

German Patent DE 102019129264 B4 discloses where moisture on the back of the measuring cell, facing away from the medium to be measured, or in parts of the evaluation electronics and the leakage currents resulting therefrom bring about a change in the triangular-waveform voltage signal $U_{COM}$ generated by the measuring capacitor in combination with a comparator-oscillator. Instead of a uniformly linearly rising and falling characteristic, a bulging characteristic ensues in this case. Specifically, the appearance of the characteristic is then such that the rise initially increases and then decreases both during the rising characteristic of the triangular-waveform signal and during the falling characteristic. Depending on how great the resistive influence is, a more or less bulging characteristic ensues. In order to detect such signal characteristics, the corresponding voltage values $U_1$, $U_2$ are acquired from the triangular-waveform voltage signal $U_{COM}$ during the falling and/or rising signal characteristic in at least two defined times $t_1$, $t_2$ and a linear equation U=f(t) is determined on the basis of the two value pairs $t_1$; $U_1$ and $t_2$; $U_2$. Using this linear equation U=f(t), it is possible to calculate the time $t_x$ at which the voltage value $U_x$ that is set as the threshold or switching point in the comparator-oscillator is reached within the falling or rising signal characteristic. An error signal is generated either when the time $t_x$ deviates significantly from the actual switching time of the comparator-oscillator or when the imaginary operating frequency calculated by the imaginary switching point of the comparator-oscillator defined at the time $t_x$ deviates significantly from the actual operating frequency of the comparator-oscillator.

An object of the invention is to further improve the reliability of the method known from German Patent DE 102019129264 B4 for detecting an error influence on the measurement result due to, in particular, leakage currents caused by moisture.

SUMMARY OF THE INVENTION

A method for monitoring the operation of a capacitive pressure measuring cell which has a measuring capacitor ($C_M$) and a reference capacitor ($C_R$) is disclosed, where an internal excitation voltage $U_{E0}$ is applied in the form of an alternating square-wave signal, and the pressure measured value p is obtained from the capacitance values of the measuring capacitor ($C_M$) and the reference capacitor ($C_R$); wherein the measuring capacitor ($C_M$) converts the excitation voltage $U_{E0}$ into a rising or falling voltage signal $U_{COM}$ by integration; wherein the voltage signal $U_{COM}$ is supplied to a comparator-oscillator (SG), resulting in the excitation voltage $U_{E0}$ being generated; and wherein the corresponding voltage values $U_1$, $U_2$ are acquired from the voltage signal $U_{COM}$ during the falling and/or rising signal characteristic in at least two defined times $t_1$, $t_2$ and a linear equation $U=f(t)$ is determined on the basis of the two value pairs $t_1$; $U_1$ and $t_2$; $U_2$; wherein at least one time $t_3$ is defined between the time $t_2$ and the switching point of the voltage signal $U_{COM}$ that is set in the comparator-oscillator (SG), the associated voltage value $U_3$ is calculated using the linear equation $U=f(t)$ within the falling or rising signal characteristic at this time $t_3$ and this voltage value $U_3$ is compared with the actual value of the voltage signal $U_{COM}$ at the time $t_3$ in terms of absolute value; wherein if the value of the voltage signal $U_{COM}$ is greater than the calculated voltage value $U_3$, an external influence of electromagnetic and/or low-frequency nature is present and if the value of the voltage signal $U_{COM}$ is less than the calculated voltage value $U_3$, a resistive interfering influence caused by moisture may be present.

BRIEF DESCRIPTION OF THE DRAWINGS

The present invention is explained by way of example with reference to the attached drawings based on preferred exemplary embodiments, wherein the features shown below both individually and in combination may represent an aspect of the invention. In the drawings.

Figure 1:
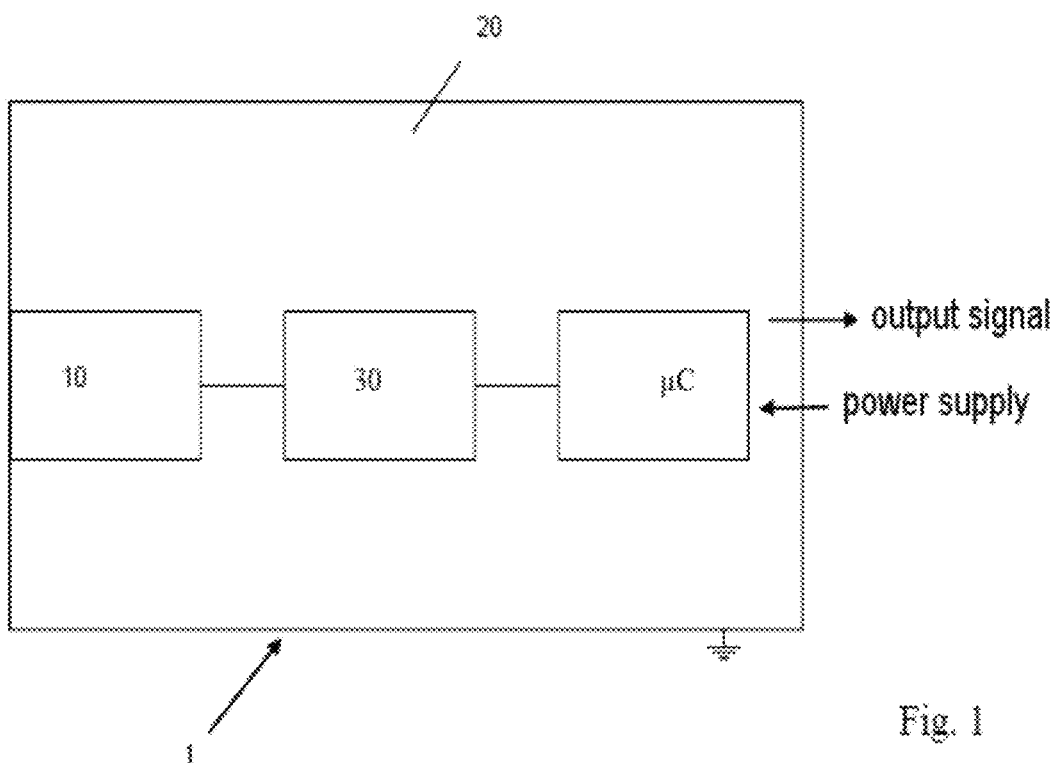
FIG. 1 shows a block diagram of a capacitive pressure measuring device.

In the description of the preferred embodiments that follows, identical reference signs denote identical or comparable components.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification and the attached drawings and claims.

DESCRIPTION OF THE PREFERRED EMBODIMENTS

For a general understanding of the present invention, reference is made to the drawings. The present invention will be described by way of example, and not limitation. Modifications, improvements and additions to the invention described herein may be determined after reading this specification and supporting claims and viewing the accompanying drawings; such modifications, improvements, and additions being considered included in the spirit and broad scope of the present invention and its various embodiments described or envisioned herein.

The present invention is based on the knowledge that the triangular-waveform voltage signal $U_{COM}$ is influenced not only by leakage currents caused by moisture, but also by possible electromagnetic and/or low-frequency interference sources located in the surroundings of the pressure sensor, for example disturbances in the power supply, powerful devices or inverters in the vicinity which only slightly interfere with the operation of the sensor itself. A defect in the internal protective circuitry could also lead to a corresponding effect. However, that makes it more difficult to interpret the change in signal and can lead to a false-positive assumption that there are leakage currents caused by moisture.

Studies have shown that in the presence of an electromagnetic and/or low-frequency interfering influence the voltage signal $U_{COM}$ does not necessarily manifest itself in a bulging manner, in the sense of a single increasing and then decreasing rise, during the rising or falling characteristic but rather is constituted by a kind of sinusoidal wave motion.

For the purpose of detecting such signal characteristics, the method according to the invention makes provision for the linear equation $U=f(t)$ known from German Patent DE 102019129264 B4, which is determined by voltage values $U_1$, $U_2$ present in at least two defined times $t_1$, $t_2$, to be used to calculate the voltage value $U_3$ associated with at least one further time $t_3$. This time $t_3$ is defined between the time $t_2$ and the switching point of the voltage signal $U_{COM}$ that is set in the comparator-oscillator (SG). The voltage value $U_3$ is eventually compared with the actual value of the voltage signal $U_{COM}$ at this time $t_3$ in terms of absolute value, i.e. without taking the arithmetic sign into consideration, only the positive value. Should the value of the voltage signal $U_{COM}$ be greater than the calculated voltage value $U_3$, an external influence of electromagnetic and/or low-frequency nature is present, whereas if the value of the voltage signal $U_{COM}$ is less than the calculated voltage value $U_3$, a resistive interfering influence caused by moisture may come into consideration.

Advantageously, the signal characteristic is observed for several seconds during which the triangular-waveform voltage value $U_{COM}$ has covered more than one hundred periods. Provided that the above-described first case, i.e. the value of the voltage signal $U_{COM}$ being less than the calculated voltage value $U_3$, occurs even just once in this observation period, any previously issued error message about a resistive interfering influence caused by moisture can be dismissed as untrustworthy.

A further advantageous development makes provision for the excitation voltage $U_{E0}$ to have a varying frequency. The switching point of the voltage signal $U_{COM}$ then varies over a defined period of time. As a result, systematic errors can be ignored since the varying frequency constantly presents new situations. Preferably, the change in frequency is produced by changing at least one threshold of the comparator-oscillator. However, the time $t_3$ is in each case always between the time $t_2$ and the switching point of the voltage signal $U_{COM}$, which switching point may vary over time.

It can also be advantageous to specify further times $t_4$, $t_5$, . . . in addition to the time $t_3$, which further times are likewise defined between the time $t_2$ and the switching point of the voltage signal $U_{COM}$ that is set in the comparator-oscillator (SG). In this way, the method according to the invention can also be carried out multiple times within one half-period.

It is therefore possible to monitor the operation of the pressure measuring cell of a capacitive pressure sensor using the existing evaluation circuit and thus without additional components by way of a clever signal evaluation and to reliably distinguish resistive error influences caused by leakage currents from other interfering influences.

FIG. 1 shows a block diagram of a typical capacitive pressure measuring device that is used to measure a process pressure p (e.g. of oil, milk, water, etc.). The pressure measuring device 1 is embodied as a two-conductor device and essentially comprises a pressure measuring cell 10 and evaluation electronics 20. The evaluation electronics 20 comprise an analogue evaluation circuit 30 and a microcontroller μC, in which the analogue output signal from the evaluation circuit 20 is digitized and processed further. The microcontroller μC provides the evaluation result in the form of a digital or analogue output signal e.g. to a PLC. For the supply of power, the pressure measuring device 1 is connected to a power supply line (12-36 V).

Figure 2:
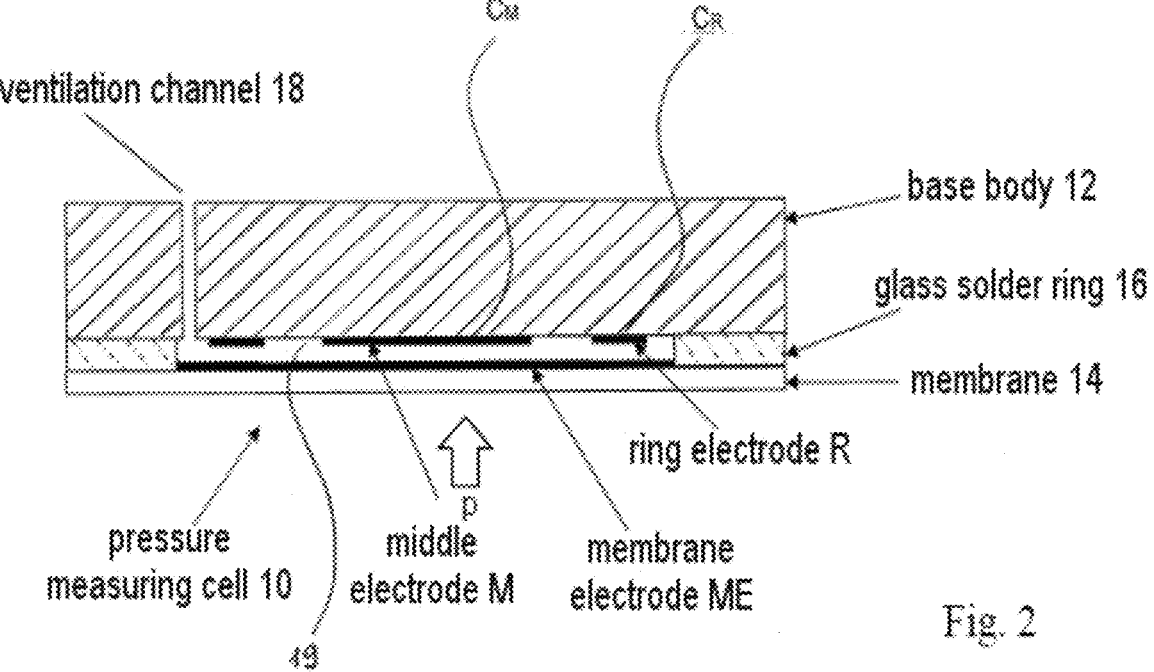
FIG. 2 shows a schematic sectional representation of a capacitive pressure measuring cell.

FIG. 2 shows a typical capacitive pressure measuring cell 10, as is commonly used in capacitive pressure measuring devices, in a schematic representation. The pressure measuring cell 10 essentially comprises a base body 12 and a membrane 14, which are connected to one another via a glass solder ring 16. The base body 12 and the membrane 14 delimit a cavity 19, which—preferably only in low pressure ranges up to 50 bar—is connected to the back of the pressure measuring cell 10 via a ventilation channel 18.

There is provision both on the base body 12 and on the membrane 14 for a plurality of electrodes that form a reference capacitor $C_R$ and a measuring capacitor $C_M$. The measuring capacitor $C_M$ is formed by the membrane electrode ME and the middle electrode M, and the reference capacitor $C_R$ is formed by the ring electrode R and the membrane electrode ME.

The process pressure p acts on the membrane 14, which flexes to a greater or lesser degree according to the applied pressure, with essentially the distance from the membrane electrode ME to the middle electrode M changing. This leads to a corresponding change of capacitance in the measuring capacitor $C_M$. The influence on the reference capacitor $C_R$ is less because the distance between the ring electrode R and the membrane electrode ME changes to a smaller degree than the distance between the membrane electrode ME and the middle electrode M.

No distinction is drawn between the label for the capacitor and its capacitance value below. $C_M$ and $C_R$ therefore denote both the measuring or reference capacitor per se and the respective capacitance thereof.

Figure 3:
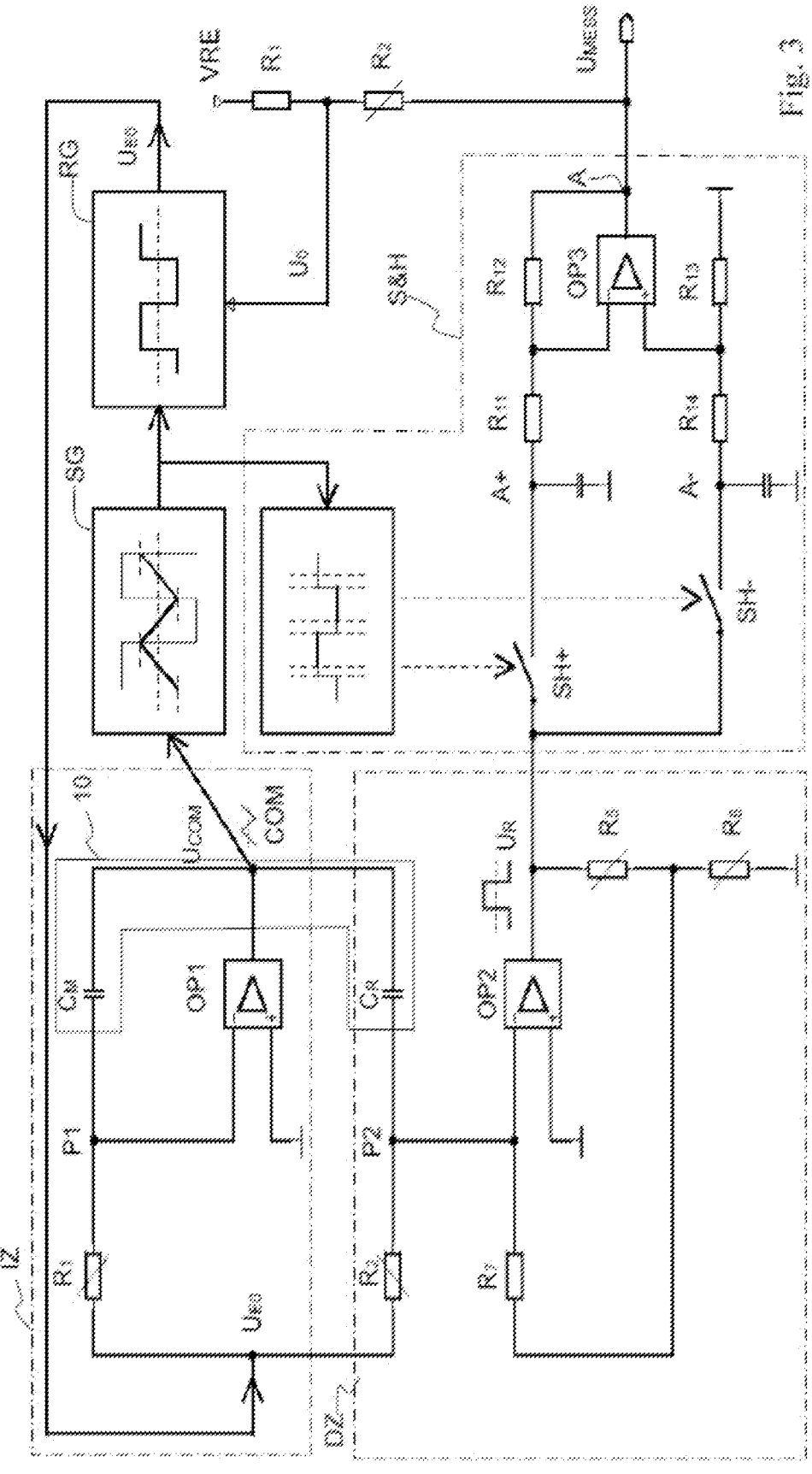
FIG. 3 shows a known evaluation circuit for a capacitive pressure measuring cell as shown in FIG. 2.

FIG. 3 shows a known evaluation circuit 30 for the pressure measuring cell 10 in more detail. The measuring capacitor $C_M$ is arranged together with a resistor $R_1$ in an integrating branch IZ and the reference capacitor $C_R$ is arranged together with a resistor $R_2$ in a differentiating branch DZ. The input of the integrating branch IZ has a square-wave voltage $U_{E0}$ applied to it, which preferably alternates symmetrically about 0 volt. The input voltage $U_{E0}$ is converted by way of the resistor $R_1$ and the measuring capacitor $C_M$, using an operational amplifier OP1 operating as an integrator, into a linearly rising or falling voltage signal (depending on the polarity of the input voltage), which is output at the output COM of the integrating branch IZ. The measurement point P1 is virtually connected to earth by way of the operational amplifier OP1.

The output COM is connected to a threshold comparator SG that controls a square-wave generator RG. As soon as the voltage signal $U_{COM}$ at the output COM exceeds or falls short of a threshold, the comparator SG changes its output signal, whereupon the square-wave generator RG inverts its output voltage in each case.

The differentiating branch DZ further comprises an operational amplifier OP2, a voltage divider containing the two resistors $R_5$ and $R_6$ and a feedback resistor $R_7$. The output of the operational amplifier OP2 is connected to a sample-and-hold circuit S&H. The output of the sample-and-hold circuit S&H has the measurement voltage $U_{Mess}$ applied to it, from which the process pressure p acting on the pressure measuring cell 10 is obtained.

The operation of this measuring circuit is explained in more detail below. The operational amplifier OP1 ensures that the connecting point P1 between the resistor $R_1$ and the measuring capacitor $C_M$ is virtually kept at earth. As a result, a constant current $I_1$ flows via the resistor $R_1$, which charges the measuring capacitor $C_M$ until the square-wave voltage $U_{E0}$ changes its arithmetic sign.

It can be seen from FIG. 3 that, if $R_1 = R_2$ and $C_M = C_R$, the measurement point P2 in the differentiating branch DZ is at the same potential as the measurement point P1, that is to say at earth level, even if the connection between the measurement point P2 and the operational amplifier OP2 were not present. This applies not only in this specific case, but rather whenever the time constants $R_1 * C_M$ and $R_2 * C_R$ are identical to one another. The null point comparison results in this state being set in an appropriate manner by way of the variable resistors $R_1$ and $R_2$. If the capacitance of the measuring capacitor $C_M$ changes as a result of the effect of pressure, the condition of the time constants in the integrating branch IZ and in the differentiating branch DZ being identical no longer exists and the potential at the measurement point P2 would differ from the value zero. This change is opposed directly by the operational amplifier OP2, however, since the operational amplifier OP2 continues to virtually keep the connecting point P2 at earth. The output of the operational amplifier OP2 therefore has a square-wave voltage $U_R$ applied to it, the amplitude of which is dependent on the quotient of the two time constants. It can easily be shown that the amplitude is directly proportional to the process pressure $p \sim C_R/C_M - 1$, the dependency being substantially linear. The amplitude can be set by way of the voltage divider formed by the two resistors $R_5$ and $R_6$.

A sample&hold circuit S&H is used to add the absolute values of the positive and negative amplitudes A+ and A− of the square-wave signal, to output the absolute value A at the output of the operational amplifier OP3 as the measurement voltage $U_{Mess}$ and to forward it to the microcontroller □C (not shown). The measurement voltage could also be output directly as an analogue value, however. The amplitude of the input voltage $U_{E0}$ applied to the output of the square-wave generator RG is set on the basis of the measurement voltage $U_{Mess}$, in order to achieve better linearity. For this purpose, there is provision for a voltage divider comprising the resistors $R_{20}$ and $R_{10}$. This voltage divider is connected to a reference voltage VREF and is advantageously adjustable.

Typically, the positive operating voltage V+ is +2.5 V and the negative operating voltage V− is −2.5 V.

Figure 4:
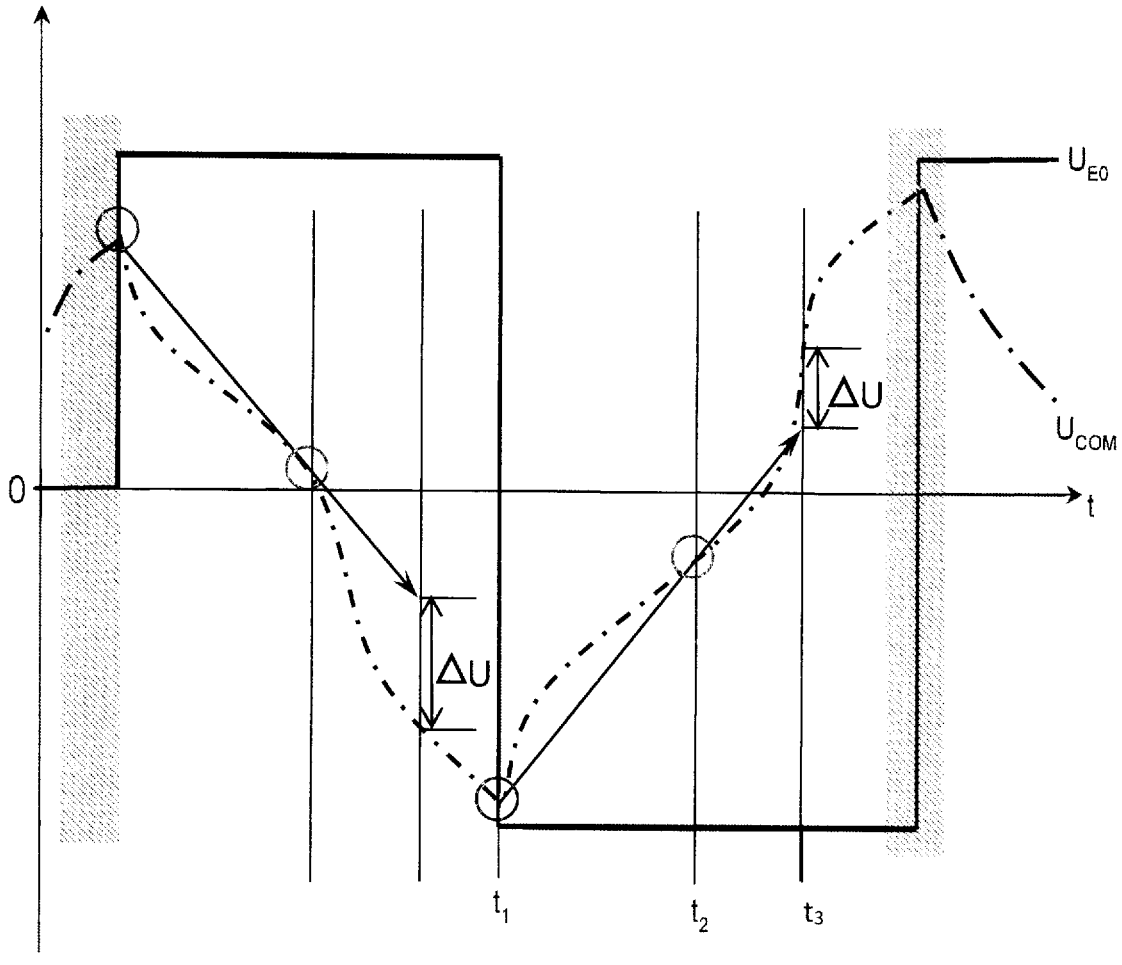
FIG. 4 shows an exemplary characteristic of a voltage signal influenced by electromagnetic and/or low-frequency interference, including a representation of the method according to the invention.

FIG. 4 shows an exemplary characteristic of a voltage signal influenced by electromagnetic and/or low-frequency interference. Firstly, a dash-dotted line shows the rising or falling voltage signal $U_{COM}$, which is largely determined by the measuring capacitor $C_M$ and is output at the output COM of the integrating branch IZ. Ideally, i.e. without interfering influence, this line has an exactly linearly rising and falling characteristic. In the present case, a wave-like characteristic has been depicted by way of example. Depending on how great the influences are, a more or less wave-like characteristic ensues. On the basis of the switching points set in the comparator-oscillator SG, the square-wave voltage $U_{E0}$, which alternates symmetrically about 0 volt, is generated therefrom.

According to the present invention, the corresponding voltage values $U_1$, $U_2$ are initially acquired from the voltage signal $U_{COM}$ during the falling and/or rising signal characteristic in at least two defined times $t_1$, $t_2$ and a linear equation U=f(t) is determined on the basis of the two value pairs $t_1$; $U_1$ and $t_2$; $U_2$. This linear equation is shown in FIG. 4 in the form of an arrow in each case. The time $t_1$ correlates here to the switching time from the falling to the rising signal characteristic, whereas the time $t_2$ is approximately in the middle of the rising signal characteristic. The invention is expressly not limited to these exact times, however.

At a firmly defined time $t_3$ between the time $t_2$ and the switching point of the voltage signal $U_{COM}$ that is set in the comparator-oscillator (SG), the associated voltage value $U_3$ is then calculated using the linear equation and compared with the actual value of the voltage signal $U_{COM}$ at this time $t_3$ in terms of absolute value. This comparison is shown by the indication ΔU. In the present example, the absolute value of the voltage signal $U_{COM}$ is in each case greater than that of the calculated voltage value $U_3$, which indicates the presence of electromagnetic and/or low-frequency interference.

The area shaded in grey at the end of a period suggests that the period duration, i.e. the frequency, of the excitation voltage $U_{E0}$ is advantageously variable. Preferably, this is accomplished by changing at least one threshold of the comparator-oscillator SG. In this way, systematic errors can be avoided since the switching points of the voltage signal $U_{COM}$ then continually change and consequently always form new linear equations.

Figure 5:
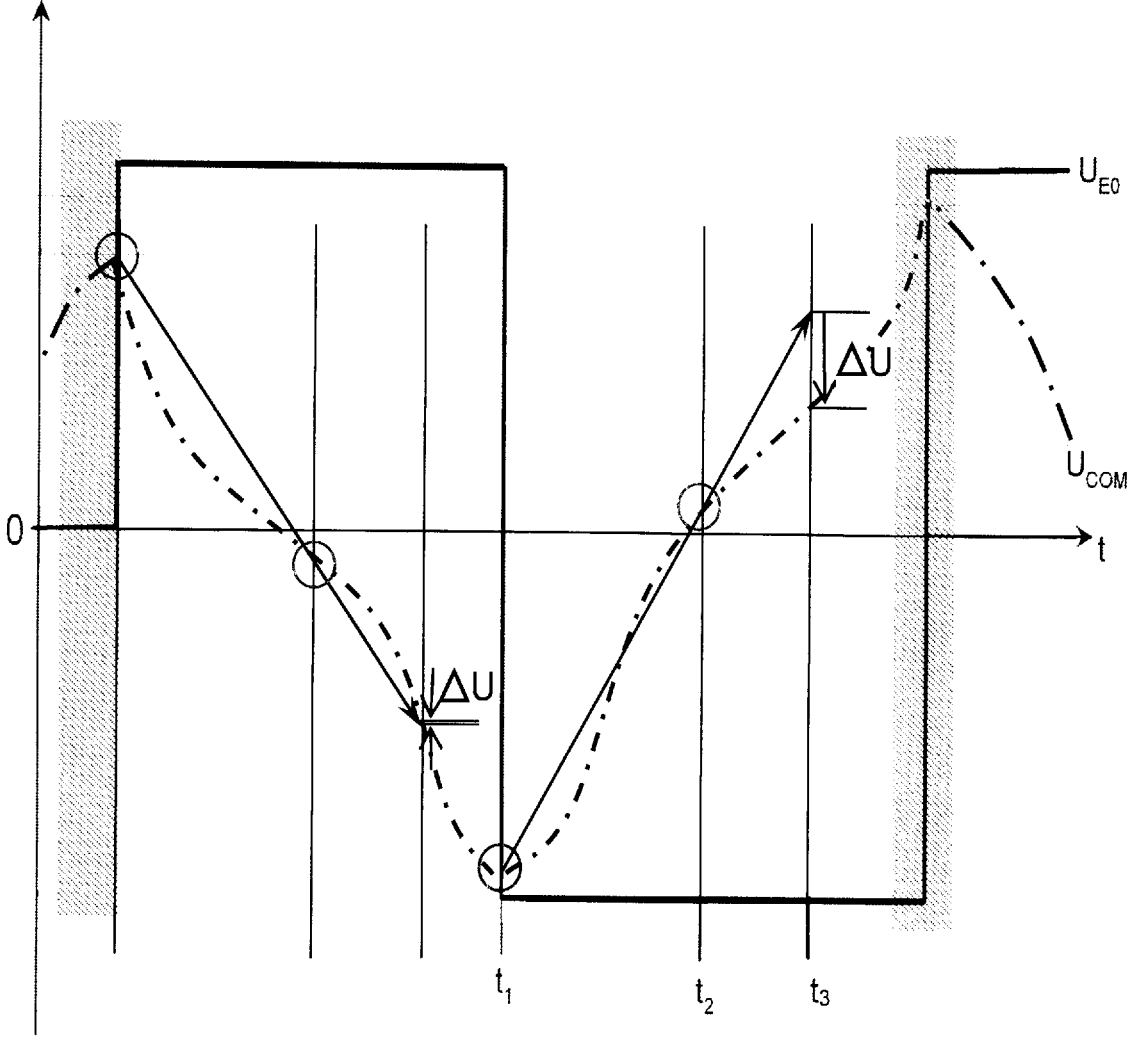
FIG. 5 shows an exemplary characteristic of a voltage signal influenced by leakage currents, including a representation of the method according to the invention.

FIG. 5 shows an exemplary characteristic of a voltage signal influenced by leakage currents. These leakage currents arise for example due to moisture on the back of the pressure measuring cell 10 or in parts of the evaluation electronics. A wave-like characteristic of the voltage signal $U_{COM}$ is shown here too. Depending on how great the resistive influence is, a more or less wave-like characteristic ensues.

In contrast to FIG. 4, the value of the voltage signal $U_{COM}$ in the half-period on the right-hand side is less than the calculated voltage value $U_3$. In the first half-period on the left-hand side, a situation is shown in which the voltage signal $U_{COM}$ that is subject to interference is coincidentally on the straight line at the relevant time $t_3$, which means that a comparison of the voltage value $U_3$ with the actual value of the voltage signal $U_{COM}$ in terms of absolute value results in a difference of zero and therefore falsely gives the impression that there is no interference. It is therefore useful to observe the signal characteristic for several seconds during which the voltage signal $U_{COM}$ has covered more than one hundred periods. This, in combination with the above-described change in the period duration, makes it possible to prevent coincidences in which the difference between the two voltage values is precisely zero from happening on an ongoing basis. Moreover, a longer observation period makes it possible to increase the reliability of error messages indicating leakage currents caused by moisture. This is because if the case that the value of the voltage signal $U_{COM}$ is less than the calculated voltage value $U_3$ occurs even just once in this observation period, any previously issued error message about a resistive interfering influence caused by moisture can be dismissed as untrustworthy.

Figure 6:
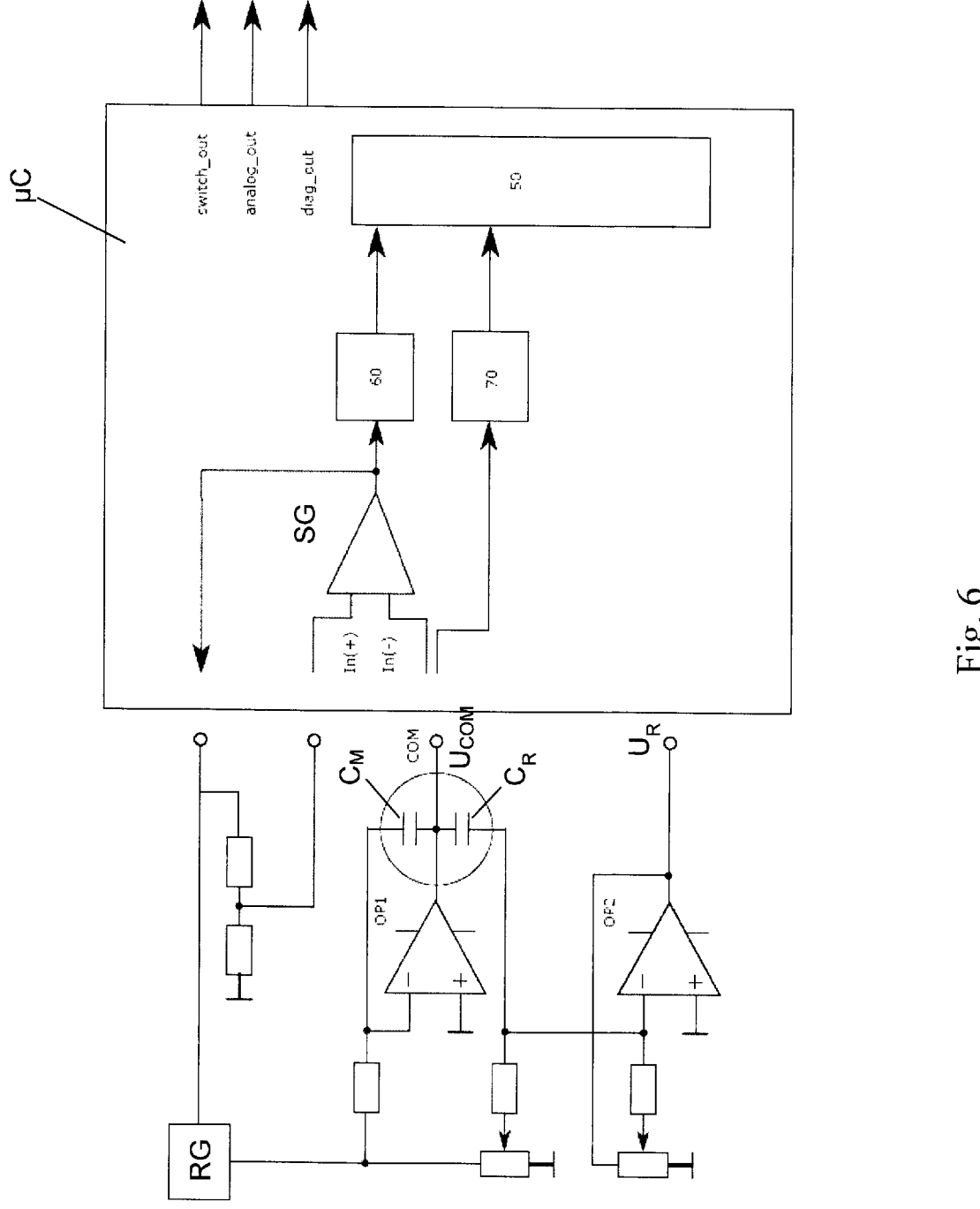
FIG. 6 shows the evaluation circuit from FIG. 3, to which a microcontroller for carrying out the method according to the invention has been added.

FIG. 6 basically shows the evaluation circuit known from FIG. 3, which has had a microcontroller μC added to it, however. This microcontroller μC firstly has the comparator-oscillator SG from FIG. 3 integrated in it and secondly contains the units required for carrying out the method according to the invention: a timer 60, a first processing unit 70 and a CPU 50 as the main processing unit. The elements located outside of the microcontroller μC are essentially identical and therefore also denoted identically. In order to avoid repetition, only the elements essential for the invention will be described below.

The output signal of the threshold comparator SG is firstly fed back again in order to control the square-wave generator RG, as is already known from FIG. 3. Secondly, this signal is supplied to the timer 60. In the timer 60, the periodic behavior of the triangular-waveform signal over time is logged, in particular with regard to the set thresholds being reached. The switching time of the triangular-waveform signal $U_{COM}$, or the period duration thereof, is derived therefrom and supplied to the CPU 50 in each case.

The first processing unit 70 is a module comprising A/D converters and CPU resources, the other inputs also having integrated A/D converters of course. This module 70 can also be integrated in the CPU unit 50. The linear equation U=f(t) is determined in this first processing unit 70. Next, the voltage value $U_3$ present at the time $t_3$ is firstly calculated in the CPU 50 itself using the linear equation U=f(t) and then the calculated voltage value $U_3$ is compared with the actual value of the voltage signal $U_{COM}$ at the time $t_3$ in terms of absolute value. Error signals generated in accordance with this evaluation are output at the output diag_out.

The currently measured pressure value in the form of the voltage signal $U_R$ known from FIG. 3 is delivered unchanged to the output switch_out or analog_out of the microcontroller μC in order to output the measured pressure values as a switching or analogue signal. The sample&hold circuit S&H known from FIG. 3, as part of the evaluation circuit shown there, is then likewise integrated in the micro-controller µC and reproduced there in a functionally identical manner.

<div style="text-align:center">LIST OF REFERENCE SIGNS</div>

1 pressure measuring device
10 pressure measuring cell
12 base body
14 membrane
16 glass solder ring
18 ventilation channel
19 cavity
20 evaluation electronics
30 evaluation circuit
50 main processing unit, CPU
60 timer
70 first processing unit
$C_M$ measuring capacitor
$C_R$ reference capacitor
M middle electrode
R ring electrode
ME membrane electrode
IZ integrating branch
DZ differentiating branch
SG threshold comparator
RG square-wave generator While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the attached drawings and claims.

What is claimed is:

1. A method for monitoring the operation of a capacitive pressure measuring cell (10) which has a measuring capacitor ($C_M$) and a reference capacitor (CR), wherein an internal excitation voltage Ugo is applied in the form of an alternating square-wave signal, and a pressure measured value p is obtained from the capacitance values of the measuring capacitor ($C_M$) and the reference capacitor ($C_R$);

wherein the measuring capacitor ($C_M$) converts the excitation voltage $U_{E0}$ into a rising or falling voltage signal $U_{COM}$ by integration;

wherein the voltage signal $U_{COM}$ is supplied to a comparator-oscillator (SG), resulting in the excitation voltage $U_{E0}$ being generated;

and wherein the corresponding voltage values $U_1$, $U_2$ are acquired from the voltage signal $U_{COM}$ during the falling and/or rising signal characteristic in at least two defined times $t_1$, $t_2$ and a linear equation $U=f(t)$ is determined on the basis of the two value pairs $t_1$; $U_1$ and $t_2$;$U_2$;

wherein at least one time $t_3$ is defined between the time $t_2$ and the switching point of the voltage signal $U_{COM}$ that is set in the comparator-oscillator (SG), the associated voltage value $U_3$ is calculated using the linear equation $U=f(t)$ within the falling or rising signal characteristic at this time $t_3$ and this voltage value $U_3$ is compared with the actual value of the voltage signal $U_{COM}$ at the time $t_3$ in terms of absolute value;

wherein if in a first case the value of the voltage signal $U_{COM}$ is greater than the calculated voltage value $U_3$, an external influence of electromagnetic nature is present and wherein if in a second case the value of the voltage signal $U_{COM}$ is less than the calculated voltage value $U_3$, a resistive interfering influence caused by moisture may be present.

2. The method according to claim 1, wherein the first case and the second case are counted in a time interval in which the triangular-waveform voltage signal $U_{COM}$ has covered more than one hundred periods.

3. The method according to claim 1, wherein the excitation voltage $U_{E0}$ has a varying frequency.

4. The method according to claim 3, wherein the varying frequency of the excitation voltage $U_{E0}$ is produced by changing at least one threshold of the comparator-oscillator (SG).

5. The method according to claim 1, wherein the time $t_1$ correlates to the switching time of the voltage signal $U_{COM}$.

6. The method according to claim 1, wherein the time $t_2$ is in the first half of the falling or rising signal characteristic.

7. The method according to claim 1, wherein the time $t_2$ is in the middle of the falling or rising signal characteristic.

8. The method according to claim 1, wherein further times $t_4$, $t_5$ are defined between the time to and the switching point of the voltage signal $U_{COM}$ that is set in the comparator-oscillator (SG), the respectively associated voltage value $U_4$, $U_5$ is calculated using the linear equation $U=f(t)$ within the falling or rising signal characteristic at these times $t_4$, $t_5$ and the respective voltage value $U_4$, $U_5$ is compared with the respective actual value of the voltage signal $U_{COM}$ at the respective time $t_4$, $t_5$ in terms of absolute value;

wherein if the value of the voltage signal $U_{COM}$ is greater than the respectively calculated voltage value $U_4$, $U_5$ an external influence of electromagnetic and/or low-frequency nature is present and if the value of the voltage signal $U_{COM}$ is less than the respectively calculated voltage value $U_4$, $U_5$, a resistive interfering influence caused by moisture may be present.

<div style="text-align:center">* * * * *</div>